Jan. 2, 1951 B. RUYSDAEL ET AL 2,536,228

INTELLIGENCE COMMUNICATION SYSTEM

Filed Dec. 5, 1947 8 Sheets-Sheet 1

Basil Ruysdael
Harold L. Hodden
Herbert I. Zagor
Francis J. Altman
INVENTORS

BY Dennis J. Mesmer
their ATTORNEY.

INTELLIGENCE COMMUNICATION SYSTEM

Filed Dec. 5, 1947 8 Sheets-Sheet 2

INVENTORS
Basil Ruysdael
Harold L Haddeu
Herbert J Zagor
Francis J Alterman
BY
Dan J Macnut
their ATTORNEY.

Jan. 2, 1951 B. RUYSDAEL ET AL 2,536,228

INTELLIGENCE COMMUNICATION SYSTEM

Filed Dec. 5, 1947 8 Sheets-Sheet 3

INVENTORS
Basil Ruysdael
Harold L. Haddow
Herbert I. Zagor
Francis J. Altman

BY

ATTORNEY.

INTELLIGENCE COMMUNICATION SYSTEM

INVENTORS
Basil Ruysdael
Harold L. Hadden
Herbert J. Zagor
Francis J. ...
BY
Dan J. Mosier
their ATTORNEY.

INVENTORS
Basil Ruysdael
Harvey F. Haddon
Herbert J. Zagor
Francis J. Altmann

BY Daniel J. Mayne
their ATTORNEY.

INTELLIGENCE COMMUNICATION SYSTEM

Filed Dec. 5, 1947 8 Sheets-Sheet 6

INVENTORS
Basil Ruysdael
Harvey F. Hadden
Herbert J. Zagor
Frances J. Alterman
BY Davis, Hoxie & Faithfull
their ATTORNEY.

INTELLIGENCE COMMUNICATION SYSTEM

Filed Dec. 5, 1947 8 Sheets-Sheet 7

INVENTOR.
Basel Ruysdael
Harold L Hadden
Herbert J Zagor
James J. Altman
BY
Daniel J. Mayne
their ATTORNEY.

Jan. 2, 1951 B. RUYSDAEL ET AL 2,536,228

INTELLIGENCE COMMUNICATION SYSTEM

Filed Dec. 5, 1947 8 Sheets-Sheet 8

INVENTORS
Basil Ruysdael
Harold G. Hadden
BY Herbert J. Zagor
Francis J. Altman

Dan J. Mount
ATTORNEY.

Patented Jan. 2, 1951 2,536,228

UNITED STATES PATENT OFFICE 2,536,228

INTELLIGENCE COMMUNICATION SYSTEM

Basil Ruysdael, Los Angeles, Calif., Harold L. Hadden, West Orange, N. J., and Herbert I. Zagor and Francis J. Alterman, Long Island City, N. Y.; said Hadden, Zagor, and Alterman assignors to said Ruysdael Application December 5, 1947, Serial No. 789,978

5 Claims. (Cl. 178—23)

This invention relates to intelligence communication systems. More particularly, the invention relates to such a system wherein selected intelligence effects are transmitted and received or recorded by virtue of pulse modulation on a single carrier frequency or on a single channel.

Various arrangements have been proposed, or are in use, for reproducing, at a receiver, intelligence data selected at a transmitter. For example, in a so-called teletypewriter system, a printing mechanism at a receiver is made to respond selectively to operation of a typewriter keyboard at a transmitter.

Such prior art systems have generally been very cumbersome and expensive, as well as indirect, sensitive to derangement, and difficult to maintain. Additionally, such systems usually require several carrier frequencies or channels for proper operation. The expense of installation and maintenance has been augmented by the necessity of using special synchronizing equipment to maintain the receiver "in step" with the transmitter.

One example of such prior art systems uses a voltage variation method for transmitting intelligence. This particular system not only requires seven carrier frequencies or channels but also is unduly complicated, delicate in its adjustments, cumbersome and expensive. In another known system, messages are translated by punching symbols on a tape and transmitting these symbols. At the receiving end, the speed of transmitting and receiving these symbols must be reduced, after which the symbols are used to actuate a special typing machine. This latter system is likewise excessively cumbersome and expensive due to the necessity of first translating the message into tape symbols and then retranslating these symbols into selected characters. This method is, to say the least, not direct.

In contradistinction, with the system of the present invention, selection of a given effect at the transmitter directly causes a unique series of pulses, of a predetermined character, to be sent out over a single channel or carrier frequency. Receipt of this unique series of pulses by the receiver directly effects a unique operation of a selected printing device, or other indicating device, directly corresponding to the effect selected at the transmitter.

For example, depression of a selected typewriter key at the transmitter directly effects actuation of a corresponding typewriter key at the receiver. In a particular example, the keying device at the transmitter comprises a series of character selecting keys arranged in rows and columns as a grid, as on a typewriter keyboard. When a selected key is operated, a series of pulses, of a predetermined character, are sent out and are indicative of the coordinates, such as the row and column position, of the selected key.

The receiver includes a printing mechanism having printing devices also arranged in rows and columns corresponding to the keys at the transmitter. The received series of pulses effects a unique selection of a printing device in a row and column—that is, having coordinates—corresponding to those of the selected key at the transmitter.

More particularly, operation of a transmitter key will cause a first determining pulse group, of predetermined character pulses, to be sent out, and varying in number in accordance with one coordinate, such as the row in which the key is located. The transmitter then operates automatically to send out a first conditioning pulse group comprising a predetermined and constant number of pulses, of a different character. This group of pulses conditions the transmitter to next send out another determining pulse group comprising pulses of the first predetermined character, varying in number in accordance with the other coordinate, such as the column position of the selected key. Following this second selection or determining pulse group, the transmitter sends out a second conditioning pulse group of a predetermined and constant number of pulses of such aforementioned different character. This last pulse group restores the transmitter to its equilibrium state, ready to transmit the code corresponding to the next selected transmitter key.

Reception of the first, or row selection, group of determining pulses by the receiver conditions all the printing devices in the selected row for operation, as, for example, by unlocking the selected row of printing devices. The following group of conditioning pulses, which are of different character and always equal in number, switches the pulse paths in the receiver to condition the column selection arrangement for operation. When the column selection group of determining pulses is received, all of the printing devices in the selected column are potentially activated. However, as only one printing device in the selected column has been unlocked (by the row selecting pulses), only one printing device, corresponding uniquely to the selected transmitter key, will actually be operated. The last conditioning group of pulses restores the receiver to equilibrium to receive the row selecting information corresponding to the next key operated at the transmitter.

In a practical embodiment of the invention, the code corresponding to a particular transmitter key comprises a first group of positive pulses, corresponding to one coordinate, such as the row in which the key is located, and a second group of positive pulses corresponding to the other coordinate, such as the column in which the key is located. Each group of positive pulses is followed by a single negative conditioning pulse, the first of which has the function of switching the transmitter and receiver for transmission and reception of column selection information and the second of which restores the transmitter and receiver to equilibrium.

By way of a specific example, suppose the key in the second row and third column is operated. Normally, the transmitter is in such state that, when conditioned for communication of intelligence, its circuit paths are arranged to transmit the row intelligence first. By virtue of this fact, when key 2—3 is operated, two positive pulses are sent out over the line. The transmitter then automatically sends out a negative pulse over the line, and this pulse also switches the transmitter circuits to "pick-up" the column information. Accordingly, the transmitter now sends out three positive pulses, corresponding to the third column, followed by a single negative pulse, which also restores the transmitter to equilibrium.

When the receiver is conditioned to receive intelligence, its selective pulse paths are in communication with its row selection mechanism. The two positive pulses therefore select, or unlock, all the printing devices in row two. The following negative pulse switches the receiver paths to its column selection mechanism, so that the next three positive pulses potentially activate all the printing devices in column three and actually operate only the printing device which is also located in row two. Consequently, a unique selection of printing device 2—3 is made. The last negative pulse restores the receiver to its equilibrium condition.

In a preferred arrangement, depression of a particular key causes a pair of condensers to be connected in circuit, one corresponding to the selected row and the other to the selected column. Each condenser has a value corresponding to its respective row or column. Thus, the condenser for row 2 would require two positive pulses to charge it to a predetermined potential and, when so charged, effects automatic operation of the transmitter to discharge the condenser which, in turn, effects the transmission of the first negative pulse. Other pulse number selection devices may be used, however, such as electronic devices having a predetermined "electronic width" corresponding to a preselected number of positive pulses.

It is necessary to maintain the receiver "tied" to the transmitter to prevent false operation due to static or noise. For this purpose, the transmitter is provided with gating means for permitting a continuous series of uniformlly spaced negative synchronizing or locking pulses to appear on the line during non-operating periods. The receiver has means maintaining the receiver "locked" against reception of freak coded pulses, due to static or the like, during reception of the series of negative pulses.

To unlock the receiver when a key is depressed, the transmitter first automatically sends out an "unlock" code or series of positive and negative pulses. This code is so selected that any freak series of positive and negative extraneous "noise" pulses will not "unlock" the receiver unless by the remote chance that the series corresponds exactly in number, character, and sequence with the "unlock" pulse group. The chance of such coincidence can be made as unlikely as desired by proper selection of the "unlock" pulse group.

Typically, such "unlock" code may comprise a series of positive pulses followed by one or more negative pulses. Operation of a transmitter key will first cause a pulse number selection device (such as a condenser) to be connected in circuit. After transmittal of the preselected number of positive pulses, the following negative pulse conditions the transmitter to transmit the row and column information, as previously described.

Reception of the "unlock" code by the receiver actuates a counting mechanism which conditions the receiver to receive the row information.

It is accordingly among the objects of this invention to provide a communications system in which any selected one of a series of effects is selectively transmitted and received over a single channel or single carrier frequency.

Another object is to provide such a system in which selection of any one of such series of effects at a transmitter directly causes selective information to be transmitted and received to directly activate an indicator at the receiver uniquely corresponding to the selected effect.

A further object is to provide a simplified synchronizing, locking and unlocking arrangement for the transmitter and receiver of such a communication system, and providing static-free and noise-free communication.

A further object is to provide such a system including receiver gating means normally locked during non-operating periods and unlocked only in response to reception of a preselected series of differing characteristic effects constituting an unlocking signal.

A still further object is to provide a transmitter effective to transmit series of characteristic pulses corresponding to the spatial position of an effect selecting key and a receiver having gating means responsive to such series of pulses to select an indicator corresponding uniquely in spatial position to such key.

Still another object is to provide a transmitter effective, upon operation of a selected effect producing key, to transmit a first series of characteristic pulses corresponding to one coordinate of such key and a second series of such characteristic pulses corresponding to the other coordinate of such key, with a pulse or pulse group of a different characteristic being transmitted in between such two series of characteristic pulses; and a receiver, operative upon reception of the first group of characteristic pulses; to select a number of indicators having the same one coordinate as such key, upon reception of the intermediate pulse or pulse group of different character to switch gating devices to a selection arrangement for the other coordinates, and, upon reception of the second series of characteristic pulses, to select uniquely the one of such number of indicators having the same other coordinate as the selected key.

Another object is to provide such a communications system which is simple, silent, compact, portable, inexpensive to construct, install, operate and maintain, and rugged in operation.

These, and other objects, and advantages and novel features of the invention will be apparent from the following description and the accompanying drawings. In the drawings.

Figure 1:
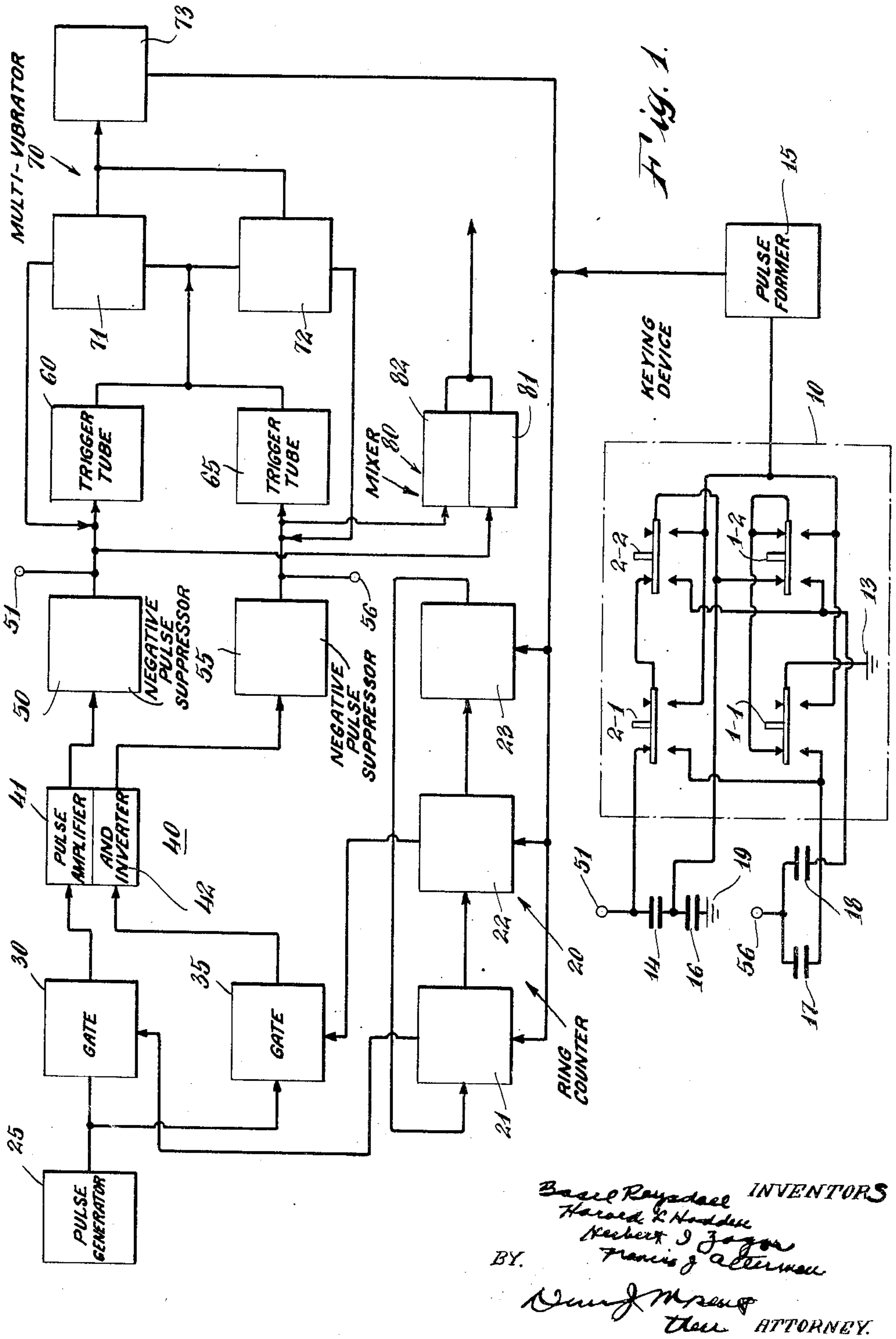
Figs. 1 and 2 are block diagrams, respectively, of a typical signal transmitter and a typical signal receiver embodying the principles of the invention.
Figure 5:
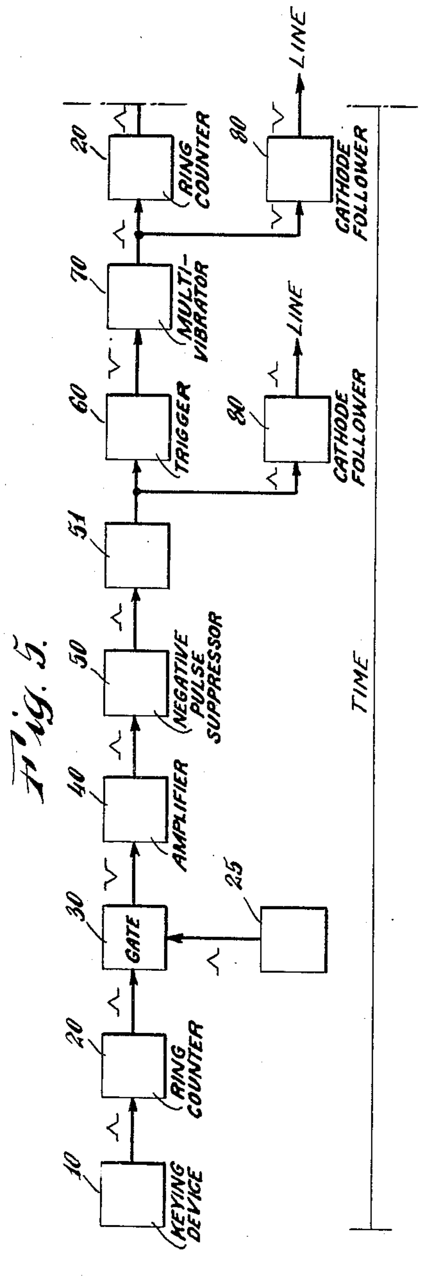
Figure 5A:
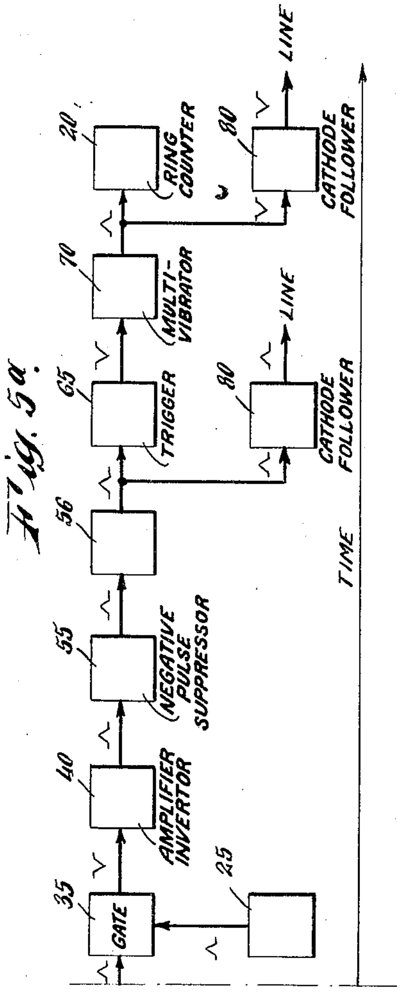

Figs. 5 and 5A, together are a block diagram illustrating the transmission of a predetermined signal with the transmitter of Fig. 1.

Figure 6:
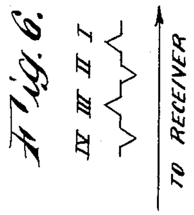

Fig. 6 schematically illustrates the signal as it appears on the line at the output of the transmitter.

Figure 2:
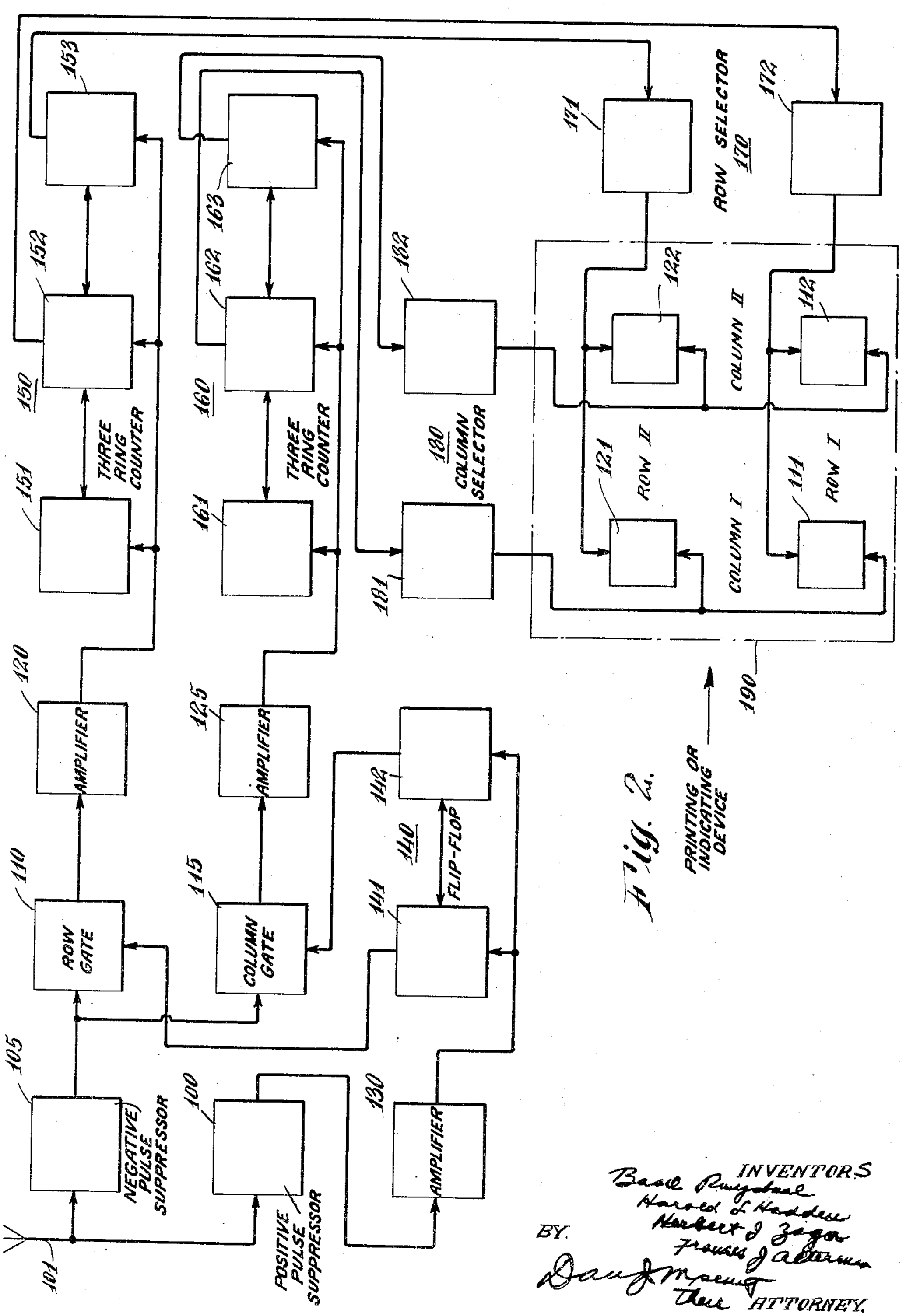
Figure 7:
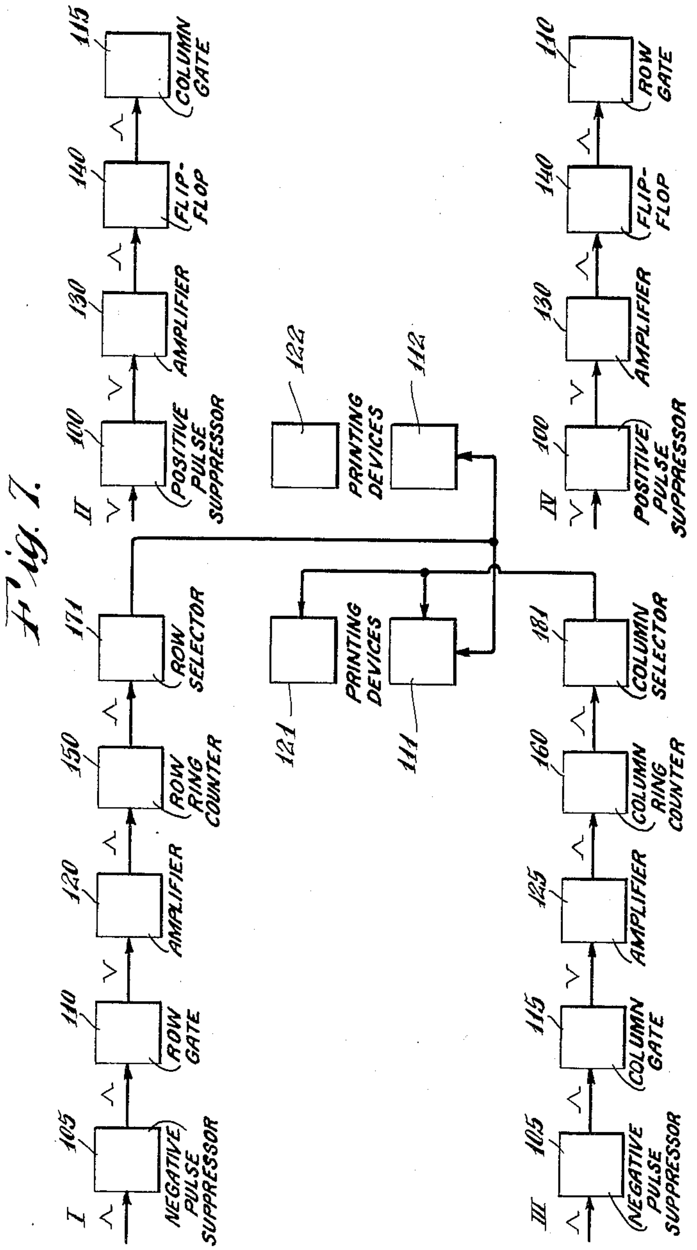

Fig. 7 schematically indicates the reception of the signal shown in Fig. 6 by the receiver of Fig. 2.

Figure 8:
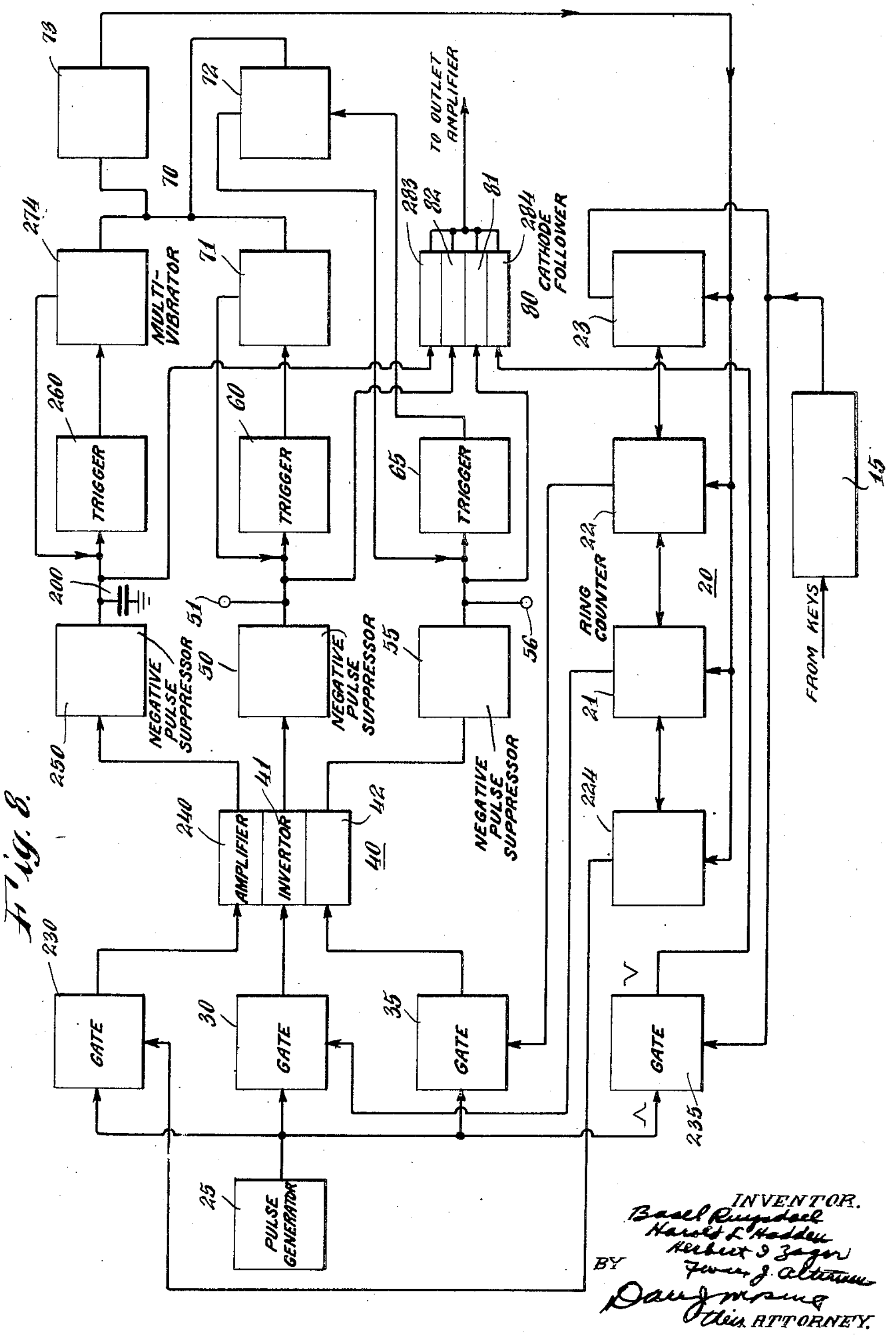

Fig. 8 is a block diagram, similar to Fig. 1, illustrating added elements for transmitting synchronizing and unlocking signals to the receiver.

Figures 9, 10:
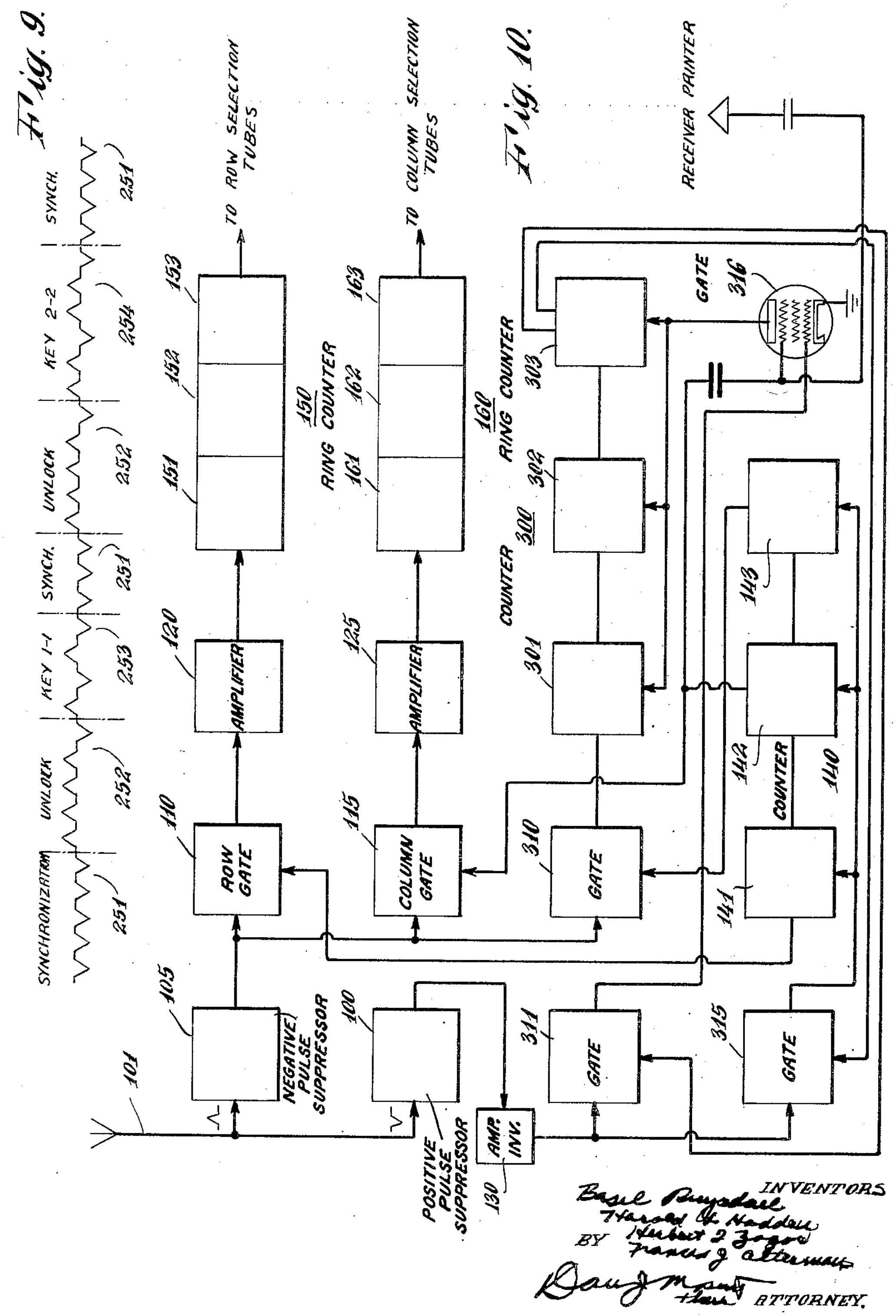

Fig. 9 is a schematic representation of the signals appearing on the line before, during and after the transmission of a predetermined signal code.

Fig. 10 is a block diagram, similar to Fig. 2, illustrating the receiver as modified to respond to the synchronizing and unlocking signals provided by the transmitter of Fig. 8.

Figure 3:
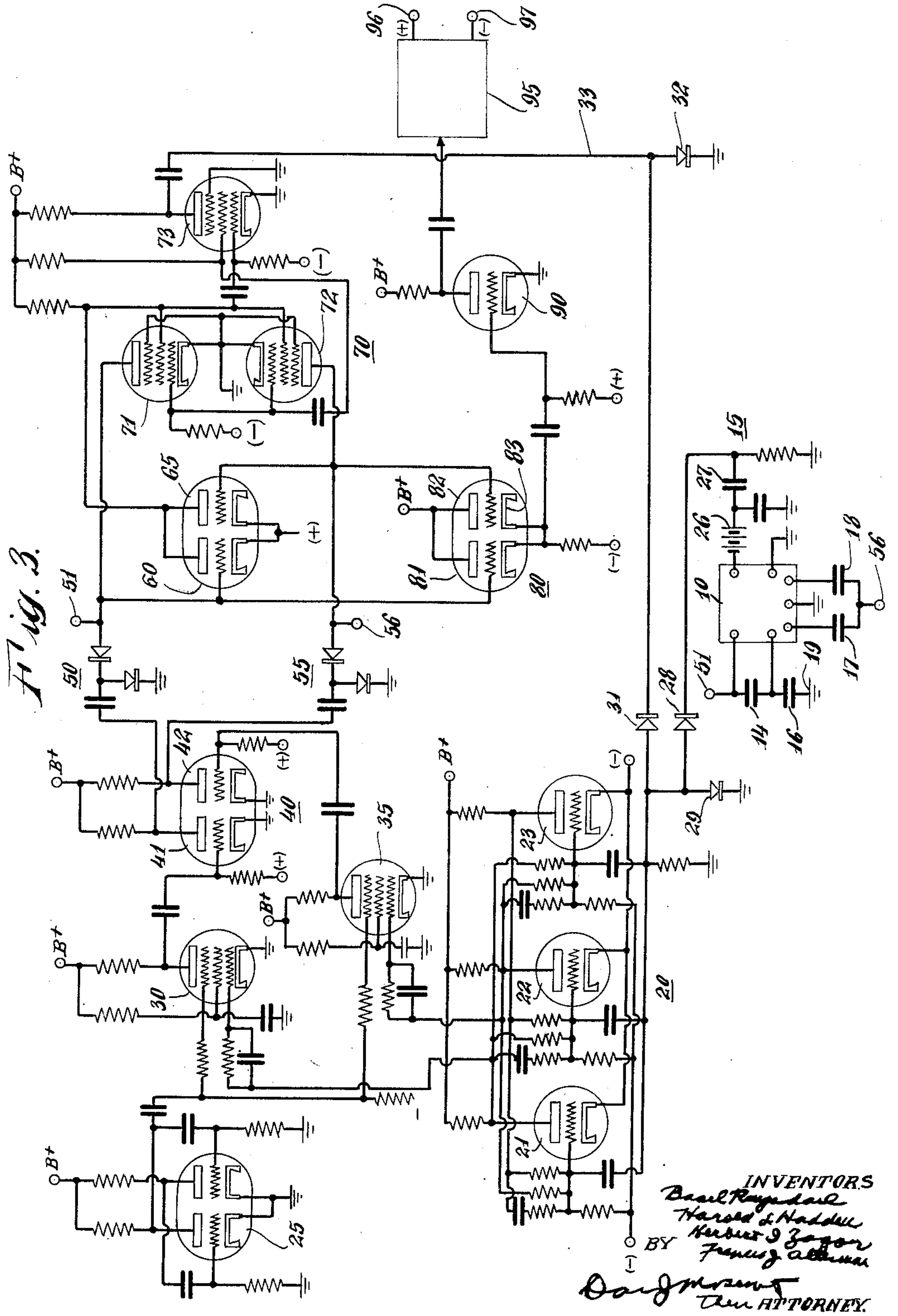
Figs. 3 and 4 are schematic wiring diagrams illustrating typical electronic components of the transmitter of Fig. 1 and the receiver of Fig. 2 respectively.

Referring to the drawings, the signal transmitter of the invention is illustrated in block diagram form Fig. 1, and Fig. 3 illustrates typical electronic components of the transmitter. As stated, an effect selecting arrangement is provided at the transmitter which, upon depression of a key representing a typical character or effect to be transmitted, activates the transmitter to transmit a group of pulses of a certain character corresponding uniquely to that particular character. For example, if a typewriter keyboard is used as a keying or coding device, a coded series of pulses will be transmitted corresponding to the relative position of the key depressed on the typewriter. Thus, assuming that the key depressed is in the second row from the bottom of the board and in the third column from the left of the keyboard, the code transmitted will be 2—3. That is, the first group, of two pulses, is representative of the row in which the key is located and the second group, of three pulses, is representative of the column in which the key is located. As will be made clear, after the transmitter has sent out two pulses of a predetermined character indicating that a key in the second row has been actuated, the transmitter is automatically conditioned to send out a pulse of an unlike or opposite character to condition the receiver to receive the next group, of three pulses, indicating that the depressed key is in the third column. The transmitter is then conditioned to send out a second pulse of such unlike or opposite character which restores the transmitter to its state of equilibrium and restores the receiver to a condition to receive the next coded series of pulses.

In a typical arrangement, the depression of a key in row 2, column 3 will cause the transmitter to send out the following sequence of pulses; two positive pulses, one negative pulse, three positive pulses, one negative pulse. As will be described more fully in connection with Figs. 8, 9 and 10, a synchronizing and unlocking arrangement is provided for static-free and noise-free transmission and reception of the signals, so that the receiver will be maintained in step with the transmitter at all times, and will be responsive to code transmission only upon reception of a predetermined unlocking code. It may be stated at this point that a typical arrangement for synchronizing and unlocking comprises a continuous series of negative pulses transmitted by the transmitter and received by the receiver during non-operating periods. The receiver is thus maintained in step with the transmitter, and an unlocking code is provided whereby the receiver will not respond to false pulses, such as due to static or the like, unless in the very remote event that such pulses may accidentally correspond to the unlocking code. Typically, such unlocking code, which is transmitted when a key is depressed and prior to the transmission of the key identifying code, may comprise a code consisting of a plurality of positive pulses followed by a single negative pulse. This conditions the receiver to operate in response to the transmitted codes corresponding to the selected characters operated on the keying device of the transmitter.

Figs. 1 and 3 show the fundamentals of the transmitter, but without the synchronizing and unlocking arrangements in order to simplify the understanding of the invention. Referring to Fig. 1, a keying device 10 is provided which, upon depression of a particular key activates a pulse former 15. A ring counter 20 comprising, in the example shown, three tubes 21, 22 and 23 are activated by the pulse former. Tube 23 is normally non-conductive in the equilibrium state of the transmitter, whereas tubes 21 and 22 are heavily conducting in such state. These latter tubes control the condition of a pair of gating tubes 30 and 35 so that, in the equilibrium state of the transmitter, these gating tubes are not effective to pass pulses generated by pulse generator 25.

A pulse amplifier and inverter 40 is provided including a section 41 connected to gating tube 30 and a section 42 connected to gating tube 35. Section 41 is connected, through a negative pulse suppressor 50, to trigger tube 60 and a section 81 of an output mixing cathode follower 80. Similarly, section 42 of amplifier-inverter 40 is connected, through a negative pulse suppressor 55, to a trigger tube 65 and section 82 of cathode follower 80. The latter is connected to transmit pulses through output amplifiers to the line, which may either be a metallic conductor, such as a wire or the like, or a single radio channel having a predetermined carrier frequency. Terminals 51 and 56 associated with keying device 10 are connected, respectively, between each pulse suppressor and each trigger tube.

The trigger tubes 60, 65 are connected to a one-shot multi-vibrator 70 comprising three tubes 71, 72 and 73. In the equilibrium state of the transmitter, tubes 71 and 72 are non-conducting and tube 73 is heavily conductive. Likewise, terminal 51 is grounded and terminal 56 is open.

In the illustrated example, four keys 1—1, 1—2, 2—1, 2—2, arranged in columns and rows to form a grid, are shown, but it will be understood that a complete keyboard corresponding to all the desired characters is provided. Terminal 51 is connected to ground 13 through the upper contacts of keys 2—1, 2—2, 1—2 and 1—1. Another path to ground is provided through condensers 14 and 16. Terminal 56 is connected to the lower contacts of keys 1—1 and 2—1 through a condenser 17, and the lower contacts of keys 1—2 and 2—2 through a condenser 18. If key 1—1, corresponding to a character in column 1 and row 1, is depressed, terminal 51 is disconnected from ground 13 and terminal 56 is grounded at 13 through condenser 17. Condenser 14 is now shorted through the upper contacts of keys 2—1 and 2—2 and terminal 51 is connected through condenser 16 to ground 19.

Depression of key 1—1 thus connects terminal 51 to ground 19 through condenser 16, and terminal 56 to ground 13 through condenser 17. Pulse former 15 is activated by connection to ground 13 through key 1—1, and feeds one positive pulse into the ring counter 20. This positive pulse causes tube 23 to become conducting and tube 21 to become non-conducting. When tube 21 becomes non-conducting its potential is raised sufficiently to bring gating tube 30 to the conducting level and thus open this gating tube.

A positive pulse from pulse generator 25 is then fed through gating tube 30 into section 41 of amplifier-inverter 40. In going through gating tube 30, the positive pulse is amplified and inverted so that it enters amplifier-inverter 40 as a negative pulse. In the latter, the pulse is again amplified and inverted so that it passes through negative pulse suppressor 50 as a positive pulse.

The size of condenser 16, corresponding to keys in row I, is so selected that a single pulse is sufficient to charge the condenser to such a potential as to bring trigger tube 60 above its cut-off value. This causes the one-shot multivibrator 70 to flip, while the positive pulse is transmitted to section 81 of cathode follower 80, amplified and sent out on the line. When the multi-vibrator is tripped or flips, tube 71 conducts and discharges condenser 16 through terminal 51. The resulting negative pulse formed when electron tube 71 conducts, is fed through the line through the cathode follower 80.

When the multi-vibrator flips, tube 73 goes to the non-conducting state, causing a positive pulse to be transmitted to ring counter 20. This positive pulse causes tube 21 to again become conductive which in turn causes tube 22 to become non-conductive. The resulting high-potential of tube 22 renders gating tube 35 conductive. As tube 21 is again conductive, its potential is so low that gating tube 30 becomes non-conductive or closed.

Under these conditions, a positive pulse from pulse generator 25 is fed to gating tube 35 where it is amplified and inverted and fed as a negative pulse to section 42 of amplifier-inverter 40. The pulse is again amplified and inverted and fed as a positive pulse through negative pulse suppressor 55 and thus through section 82 of cathode follower 80 and the output amplifier to the line. The size of capacitor or condenser 17, corresponding to keys in column I, is so chosen that this single positive pulse is sufficient to charge the condenser through terminal 56, to such a potential as will cause trigger tube 65 to conduct effecting a flip of the multi-vibrator 70. Tube 72 now becomes conductive and discharges condenser 17 through terminal 56 causing a negative pulse to be applied to the line through cathode follower 80. As tube 72 becomes conductive, tube 73 in turn becomes non-conductive and causes a positive pulse to be transmitted to ring counter 20. This pulse causes tube 23 to become non-conductive, thus restoring the transmitter to its state of equilibrium.

In a manner which will be apparent upon inspection, depression of key 2—2, for example, will connect terminals 51 and 56 to ground through condensers 14 and 18 respectively. As key 2—2 is in the second row and the second column, the size of condensers 14 and 18 is so selected that it will take two positive pulses to charge each of these condensers to the required potential, thus applying the code 2—2 to the line. Similarly, if key 2—1 were actuated, terminals 51 and 56 would be connected to ground through condensers 14 and 17, respectively. Thus, the code 2—1 would be applied to the line. When key 1—2 is depressed, the connection of terminals 51 and 56 to ground is through condensers 16 and 18 respectively, which require one pulse and two pulses, respectively, to charge them, thus applying the code 1—2 to the line.

In general then if a key in the "x" row and the "y" column is depressed, the information which would appear on the line would comprise "x" positive pulses, followed by one negative pulse, and then "y" positive pulses which are in turn followed by one negative pulse.

Referring to Fig. 3, the electron tubes 21, 22, 23 forming ring counter 20 are shown as triodes, although it is possible to make the ring counter by using diodes, triodes, tetrodes, pentodes or dual purpose tubes, etc. Tube 21 has its plate connected to the control grid of gating tube 30, and tube 22 has its plate connected to the control grid of gating tube 35. Tubes 30 and 35 are shown as pentode tubes which act as gates or escapement devices. Although pentodes are shown, diodes, triodes, tetrodes, or pentagrid tubes may be used for 30 and 35. Since the plate potentials of tubes 21 and 22 are low, as these tubes are conducting under equilibrium conditions of the transmitter, gates 30 and 35 are normally closed.

Amplifier-inverter 40 is shown as a two-section tube, although two separate triodes, tetrodes or pentodes may be used if desired. Pulse generator 25 is capacitatively coupled through a shielded cable to gates 30 and 35 which are capacitatively coupled respectively of sections 41 and 42 of tube 40.

The negative pulse suppressors 50 and 55 comprise rectifying devices, diagrammatically illustrated, which are so arranged as to prevent the passage of negative pulses therethrough, and the pulse suppressors are connected through shielded cables to trigger tubes 60 and 65. These latter tubes are non-conducting because they are biased below cut-off. The tubes 71 and 72, which are shown as pentodes, are the non-conducting tubes of the one-shot multi-vibrator 70 whereas pentode 73 is a conducting tube of the multi-vibrator.

The pulse former 15 includes a battery 26 coupled through a capacitance 27 to rectifiers 28, 29 and to the ring counter 20 through an arrangement comprising rectifiers 31, 32. Tube 73 is connected to ring counter 20 through a conductor 33 capacitatively coupled to the plate of tube 73.

The output amplifying arrangement comprises a triode 90 capacitatively coupled to the cathode 83 of cathode follower 80. This latter is shown as a two-section tube, although separate triodes may be used. A plate of triode 90 is capacitatively coupled to the input of a pentode 95 which further amplifies the signals and is capacitatively coupled to the output terminals 96, 97. These terminals are connected either metallically or over a radio frequency channel to the receiver.

It is the function of the receiver, shown in block diagram of Fig. 2, to decipher the code data sent out by the transmitter and causes the proper key or the like in a printing device to be operated in accordance with a key operated on the transmitter. As shown in Fig. 2 schematically, the receiver includes a positive pulse suppressor 100, and a negative pulse suppressor 105. The latter is connected to a row gate tube 110 in parallel with a column gate tube 115. Row gate tube 110 is connected through an amplifier 120 to a three-ring counter 150 comprising tubes 151, 152, 153. Similarly, column gate tube 115 is connected through an amplifier 125 to a three-ring counter 160 comprising tubes 161, 162 and 163.

Ring counter 150 controls row selection tubes generally indicated at 170 and shown, for illustration purposes only, as including a pair of tubes 171 and 172 corresponding to row I and row II respectively. Ring counter 160 controls column selection tubes indicated at 180 as including a pair of tubes 181 and 182 corresponding to column I and column II respectively. The row and column selection tubes control the printing or other indicating device 190. For illustration purposes, this printing device is indicated as solenoid operated printers 111, 112, 121 and 122, arranged in rows and columns to form a grid, and corresponding in spatial position, respectively to keys 1—1, 1—2, 2—1 and 2—2 of the transmitter.

Positive pulse suppressor 100 is connected through an amplifier 130 to a "flip-flop" 140 comprising a pair of tubes 141 and 142. Under normal conditions of equilibrium in the receiver, tube 141 is non-conducting and its plate potential controls row gate tube 110. As tube 141 is non-conducting, its potential is high enough so that tube 110 is open or conducting. Similarly, tube 142 is conductive and, as its plate potential controls column gate tube 115, the latter is closed or non-conducting.

In row ring counter 150, tube 151 is normally non-conducting and tubes 152, 153 are normally conducting. These latter tubes control row selection tubes 171 and 172, respectively, which are thus closed or non-conducting. Similarly, in column ring counter 160, tube 161 is normally non-conducting and tubes 162, 163 controlling column selection tubes 181, 182, are normally conductive. Thus, the column selection tubes are normally non-conducting or closed.

For the purpose of describing the operation of the receiver, it will be assumed that element or key 1—1 of the transmitter has been depressed causing the following sequential code to be sent out over the line: one positive pulse, one negative pulse, a second positive pulse, and a second negative pulse. When this information reaches the input line 101 of the receiver, the first positive pulse flows through negative pulse suppressor 105, open row gate tube 110 and amplifier 120. This activates row ring counter 150 to count (1). Tube 152 thereupon becomes non-conductive, making tube 172 conductive selecting the printing devices 111, 112 in row I. The first negative pulse following this positive pulse passes through positive pulse suppressor 100 and amplifier 130 causing tube 142 to become non-conductive which makes tube 141 conductive. This in turn makes column gate tube 115 conductive and row gate tube 110 non-conductive. The succeeding positive pulse thereupon passes through negative pulse suppressor 105, column gate tube 115 and amplifier 125. This causes column ring counter 160 to count (1). Tube 162 becomes non-conducting, rendering column gate tube 181 conducting. This selects devices 111 and 121 in column I. As column I and row I have both been selected, the printing device 111 is uniquely determined effecting operation of this printing device to give an indication identical with that selected by depressing key 1—1 of the transmitter. The second negative pulse causes tube 141 to become non-conductive and tube 142 to become conductive.

When the printing device or indicator operates, the ring counters 150 and 160 are returned to their equilibrium position in which tubes 151 and 161 are non-conducting. This is accomplished for example by means of a microswitch (not shown) opening the cathode circuits of tubes 151, 161 upon operation of any of the printing devices. The receiver is thus restored to its equilibrium condition and is ready for the next group of pulses.

Figure 4:
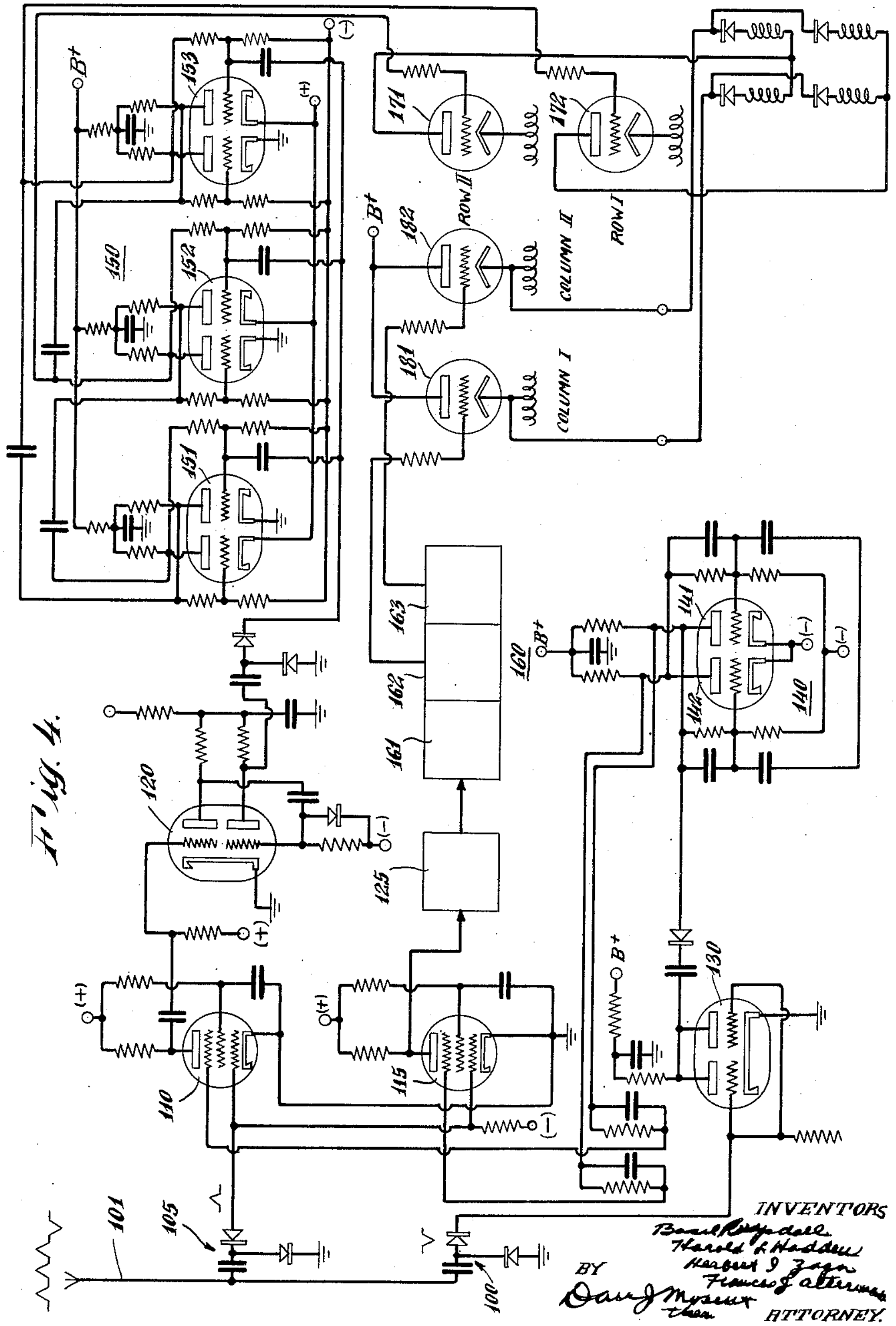

Fig. 4 illustrates the electronic components of the receiver. Positive pulse suppressor 100 is illustrated as an arrangement of rectifiers effective to pass negative pulses but not positive pulses and negative pulse suppressor 105 is illustrated as an arrangement of rectifiers effective to pass positive pulses but not negative pulses.

Suppressor 105 is connected capacitatively to gate tubes 110 and 115. These latter tubes are capacitatively coupled to two-section amplifiers 120 and 125, respectively, which may be dual triodes. The amplifiers are connected capacitatively, through directional rectifying devices, to the ring counters 150 and 160. To avoid duplication and simplify the drawing, amplifier 125 and ring counter 160 have been shown in block form only, as their electronic arrangements are similar with amplifier 120 and ring counter 150 respectively. The tubes of the ring counter 150 are two-section tubes, and tubes 152 and 153 are directly coupled to row gate tubes 171, 172 respectively, and tubes 162, 163, of ring counter 160, column gate tubes 181, 182 respectively.

Suppressor 100 is capacitatively coupled to an electron tube amplifier 130 which is in turn capacitatively coupled to a two-section tube forming the "flip-flop" 140. Section 141 of tube 140 controls row gate tube 110 and section 142 controls column gate tube 115.

Fig. 5 shows the actual sequence of operation of the transmitter in sending out the code of pulses corresponding to the depression of key 1—1. When key 1—1 of the keying device 10 is depressed, a positive pulse goes to ring counter 20 which opens gating tube 30. A positive pulse from pulse generator 25 is amplified and inverted in tube 30 and again amplified and inverted in tube 40. This pulse passes through negative pulse suppressor 50 and charges the condenser connected to terminal 51. The positive pulse is then sent out on the line through cathode follower 80. Also, trigger tube 60 becomes conducting, causing the one shot multivibrator 70 to flip which, as described, sends a negative pulse out on the line through cathode follower 80. A positive pulse is at the same time applied to ring counter 20 to open gate tube 35.

A second positive pulse then passes from pulse generator 25 through gate tube 35, amplifier-inverter 40 and negative pulse suppressor 55 to charge the condenser connected to terminal 56. This second positive pulse then appears on the line through cathode follower 80. Trigger tube 65 becomes conductive, causing by means of 70 a negative pulse to be sent out on the line through cathode follower 80 and a positive pulse to be applied to ring counter 20 restoring the transmitter to equilibrium. The series of pulses sent out on the line is diagrammatically shown in Fig. 6 as comprising a positive pulse I, negative pulse II, positive pulse III and negative pulse IV.

This information is received by the receiver as shown in Fig. 7. The first positive pulse I passes through negative pulse suppressor 105, row gate tube 110, amplifier 120, row ring counter 150 and row selection tube 171 to select either of the printing devices 111, 112 in row 1. The following negative pulse II passes through positive pulse suppressor 100, amplifier 130 to operate "flip-flop" 140 opening column gate tube 115 and closing row gate tube 110.

The next positive pulse III passes through negative pulse suppressor 105, column gate tube 115, amplifier 125 and column ring counter 160 to operate column gate tube 181 which completes the selection of printing device 111. The second negative pulse IV passes through positive pulse suppressor 100 and amplifier 130 to operate "flip-flop" 140 opening row gate tube 110 and closing column gate tube 115. As described above, operation of the printing device restores the ring counters 150 and 160 to a state of equilibrium.

In the basic system just described, means have been provided to transmit signal intelligence data from a transmitter to a receiver. However, the means for checking the transmitted data for accuracy or for insuring proper synchronization between the transmitter and receiver have been shown and described. Figs. 8 and 10 illustrate these control features as added to the transmitter and receiver of Figs. 1 and 2, respectively. As shown in Fig. 8, which is a block diagram of the complete transmitter, a pair of gates 230 and 235 are connected in parallel with gates 30 and 35, to signal generator 25. An extra section 240 is added to the amplifier inverter 40, preferably comprising another electron tube. An additional negative pulse suppressor 250 is connected in series with amplifier inverter 240, and this pulse suppressor is connected to an additional trigger tube 260. A condenser 290 is connected to the line between suppressor 250 and trigger tube 260. A fourth tube 274 is added to the one-shot multi-vibrator 70 and a fourth tube 224 is added to the ring counter 20 making the latter a ring counter of four. Additionally, sections 283 and 284 are added to the cathode follower 80.

In the equilibrium position, ring counter tube 23 is non-conducting which in turn renders gate 235 conducting. Positive pulses from pulse generator 25 then flow through gate tube 235 where they are amplified and inverted, as schematically shown, to emerge as negative pulses. These negative pulses appear on the line through section 284 of cathode follower 80.

Thus, before any key in keying device 10 is depressed, the information on the line will be a series of negative pulses as shown in section 251 of the pulse diagram illustrated in Fig. 9.

If element 1—1 is now depressed, the ring counter 20 is stepped to tube 224 which becomes non-conducting thus opening gate tube 230. Positive pulses from generator 25 are amplified and inverted in the tube 230, again amplified and inverted in tube 240 and pass through negative pulse suppressor 250 to charge condenser 290. If, for example, the size of condenser 290 is such that it takes four pulses to charge the condenser, trigger tube 260 will become conductive when four pulses have been transmitted. This trips multivibrator 70, discharging condenser 290 and causing a negative pulse to appear on the line through section 283 of cathode follower 80. Also, ring counter 20 is tripped to open gate 30. The code 1—1 is then transmitted to the line in the same manner as previously described in connection with Fig. 2. The last negative pulse of the code trips ring counter 20 to again open gate 235 to permit a stream of negative synchronizing or locking pulses to be sent out on the line through cathode follower 80.

Fig. 9 illustrates the sequence of pulses if key 1—1 is depressed. The first series of pulses 251 are the negative synchronization pulses. When key 1—1 is depressed, the unlocking pulse group 252 or code appears comprising four positive pulses, for example, followed by a negative pulse. The code 1—1, comprising two positive pulses each followed by a negative pulse then appears on the line as at 253 and is followed by the synchronizing negative pulses 251. If now key 2—2 is operated, the unlock code 252 appears on the line followed by the code 2—2 as shown at 254. After the code corresponding to key 22 has been sent, negative synchronizing pulses 251 again appear on the line.

The pulse series is thus divided into four groups for transmitting data. The first group is a series of negative pulses which appear at all time when no key is depressed, and which have the function of keeping the receiver locked to the transmitter by permitting no static or noise to activate the receiver and also insuring the return of the receiver to its equilibrium position. The next group is an unlocking pulse group consisting of any combination of positive and negative pulses in a predetermined code (such as four positive, one negative) in the right order to unlock the receiver so that it may receive information from the transmitter. This group is followed by a third group comprising pulses corresponding to the particular key depressed. The final group is the synchronizing series of negative pulses.

Fig. 10 illustrates the receiver of Fig. 2 as modified for the synchronizing and unlocking action. As shown, a counter 300 comprising tubes 301, 302, 303 is added. Also gates 310, 311, 315 and 316 are added as well as an additional tube 143 to the "flip-flop" 140 making the latter a ring counter of three.

In the equilibrium state of the receiver, tube 143 is non-conducting. Gate 310 is open, tubes 141 and 142 are conducting and gates 110 and 115 are closed. Tube 303 is in its zero position which keeps gate 311 open and gate 316 closed.

As long as negative pulses appear on the line, the counter 300 is maintained in its zero position regardless of whether the pulses are static or negative pulses are sent out from the transmitter, since these negative pulses flow through positive pulse suppressor 100, amplifier-inverter 900, gate 311, and into gate 316, thus continually causing gate 316 to become non-conducting which maintains counter 300 in its equilibrium position. Noise in the form of positive pulses can only open gate 316 if sequenced properly with negative pulses according to the previously chosen unlock code. The probability of this happening can be made as small as desired by proper choice of the unlock code.

With the reception of the unlock pulses group 252 (Fig. 9), four positive pulses flow into counter 300 causing gate 311 to close and gate 315 to open. The single negative pulse following the four positive pulses then flows through suppressor 100 and gate 315 to cause counter 140 to count (1). This closes gate 310 and opens row gate 110, permitting the row selecting information to flow to the row ring counter 150.

The negative pulse following the row information flows through suppressor 100, amplifier-inverter 130 and gate 315 causing counter 140 to again count (1). This closes row gate tube 110 and opens column gate tube 115, permitting the column selecting information to flow to column ring counter 160.

The first negative pulse following the column information trips counter 140. Tube 142 which has been non-conducting now becomes conducting causing a negative pulse to appear at gate 316. This momentarily breaks the cathode circuits of the tubes of counters 300 restoring the counter to its equilibrium condition. Such restoration opens gate 311 and closes gate 315, and at the same time tube 143 becomes non-conducting which opens gate 310. The receiver is now in its equilibrium condition.

Thus, the system of the present invention involves the transmission and reception of intelligence by the use of coded pulses of a predetermined character. Each intelligence identifying pulse group is delineated and bounded by one or more pulses of a different character. These latter pulses are also utilized to lock the receiver against operation on reception of false signals, such as static, noise or the like.

The use of the gating arrangements in the receiver to route successive intelligence identifying pulse groups to their characteristically responsive recording device, enables the intelligence to be transmitted over a single channel or radio frequency. The positioning pulses, which delineate and bound the determining pulse groups, act as the gate selection devices.

The system is peculiarly useful in a teletypewriter system, in which the spatial coordinates of each transmitter key are reproduced at a receiver typewriter. It will be understood that, when the invention is embodied in such system, coded pulses may be used to select upper and lower case characters and also to transmit actuations of the space bar or typewriter platen.

While particularly adaptable, as described, to transmission of intelligence by selecting intersecting recorder coordinates at the receiver corresponding to intersecting selector coordinates at the transmitter, the system may be used in conjunction with other unique qualities of a selector key to uniquely determine a recorder having corresponding qualities.

Also, while specific embodiments of the invention have been shown and described in detail, and using specific pulse codes for examples, to illustrate the application of the invention principles, it will be understood that the invention may be otherwise embodied without departing from such principles.

What is claimed is:

1. An intelligence communication system comprising, in combination, a transmitter; a receiver; a single transmission channel operatively interconnecting said transmitter and said receiver; means in said transmitter, operable during periods of non-communication of intelligence, to feed a continuous series of first pulses, of a predetermined character, into said transmission channel; means in said receiver, responsive to receipt of said series of first pulses from said channel, to lock said receiver in step with said transmitter; means for selecting an effect to be transmitted; means for translating the selected effect into a group of second pulses, differing in character from the first pulses and varying in number in accordance with the effect selected, and a group of the first pulses constant in number irrespective of the effect selected; means in said receiver, responsive to receipt of such group of second pulses, to reproduce the selected effect; and means in said receiver, responsive to receipt of such group of first pulses, to restore the receiver to the locked equilibrium condition.

2. An intelligence communication system comprising, in combination, a transmitter, a receiver; a single transmission channel operatively interconnecting said transmitter and said receiver; means in said transmitter, operable during periods of non-communication of intelligence to feed a continuous series of first pulses, of a predetermined character, into said transmission channel; means in said receiver, responsive to receipt of said series of first pulses from said channel, to lock said receiver in step with said transmitter; means for selecting an effect to be transmitted; means responsive to selection of an effect to feed into said channel an unlocking pulse group comprising a number of second pulses, differing in character from the first pulses, followed by at least one first pulse; means responsive to receipt of the unlocking pulse group to condition the receiver to receive transmitted intelligence; means for translating the selected effect into a group of second pulses varying in number in accordance with the effect selected, and a group of the first pulses constant in number irrespective of the effect selected; means in said receiver, responsive to receipt of such group of second pulses, to reproduce the selected effect; and means in said receiver, responsive to receipt of such group of first pulses, to restore the receiver to the locked equilibrium condition.

3. An intelligence communication system comprising, in combination, a transmitter; a receiver; a single transmission channel operatively interconnecting said transmitter and said receiver; means in said transmitter, operable during periods of non-communication of intelligence to feed a continuous series of negative pulses into said transmission channel; means in said receiver, responsive to receipt of said series of negative pulses from said channel, to lock said receiver in step with said transmitter; means for selecting an effect to be transmitted; means for translating the selected effect into a group of positive pulses varying in number in accordance with the effect selected, and a group of at least one negative pulse constant in number irrespective of the effect selected; means in said receiver, responsive to receipt of such group of positive pulses, to reproduce the selected effect; and means in said receiver, responsive to receipt of such group of negative pulses, to restore the receiver to the locked equilibrium condition.

4. An intelligence communication system comprising, in combination, a transmitter; a receiver; a single transmission channel operatively interconnecting said transmitter and said receiver; means in said transmitter, operable during periods of non-communication of intelligence to feed a continuous series of negative pulses into said transmission channel; means in said receiver, responsive to receipt of said series of negative pulses from said channel, to lock said receiver in step with said transmitter; means for selecting an effect to be transmitted; means responsive to selection of an effect to feed into said channel an unlocking pulse group comprising a number of positive pulses, followed by at least one negative pulse; means responsive to receipt of the unlocking pulse group to condition the received transmitted intelligence; means for translating the selected effect into a group of positive pulses varying in number in accordance with the effect selected, and a group of at least one negative pulse constant in number irrespective of the effect selected; means in said receiver, responsive to receipt of such group of positive pulses, to reproduce the selected effect; and means in said receiver, responsive to receipt of such group of negative pulses, to restore the receiver to the locked equilibrium condition.

5. An intelligence communication system comprising, in combination, a transmitter including pulse generating means and a bank of effect selecting devices arranged in intersecting columns and rows to form a grid; a receiver including a bank of effect reproducing devices arranged in intersecting columns and rows to form a grid, row selecting means, and column selecting means; a single transmission channel extending from said transmitter to said receiver; means in said transmitter, operable during periods of non-communication of intelligence to feed a continuous series of negative pulses into said transmission channel; means in said receiver, responsive to receipt of said series of first pulses from said channel, to lock said receiver in step with said transmitter and block receipt of pulses by said row and column selecting means; first means, responsive to actuation of an effect selecting device, to feed into said channel an unlock code comprising at least one positive pulse followed by at least one negative pulse; means in said receiver, responsive to receipt of such unlock code, to direct a succeeding pulse group to said row selecting means; second means, responsive to actuation of such effect selecting device, to feed into said channel a signal code comprising, in sequence, a first determining pulse group, including at least one positive pulse, varying in number in accordance with the row in which the actuated selecting device is located, a first conditioning pulse group, including at least one negative pulse, constant in number irrespective of the effect selected, a second determining pulse group, including at least one positive pulse, varying in number in accordance with the column in which the actuated selecting device is located, and a second conditioning pulse group, including at least one negative pulse, constant in number irrespective of the effect selected; said row selecting means, responsive to reception of such first determining pulse group, selecting the reproducing devices located in the row corresponding to that of the actuated selecting device; means, responsive to reception of such first conditioning pulse group, to condition the receiver to direct the second determining pulse group to said column selecting means; said column selecting means; said column selecting means, responsive to reception of such second determining pulse group, selecting the reproducing devices located in the column corresponding to that of the actuated selecting device; whereby, upon actuation of a selecting device, a uniquely corresponding reproducing device is selected; means, responsive to reception of the second conditioning pulse group, to condition the receiver to direct the next received determining pulse group into said row selecting means and, responsive to transmission of the second conditioning pulse group, to condition the transmitter to again feed such series of negative pulses into said channel.

BASIL RUYSDAEL.
HAROLD L. HADDEN.
HERBERT I. ZAGOR.
FRANCIS J. ALTERMAN.

REFERENCES CITED

The following references are of record in the file of this patent:

UNITED STATES PATENTS

| Number | Name | Date |
|---|---|---|
| 316,698 | Hoevenbergh | Apr. 28, 1885 |
| 1,383,750 | Parker | July 5, 1921 |
| 1,709,031 | McCoy | Apr. 16, 1929 |
| 2,013,671 | Roe | Sept. 10, 1935 |
| 2,425,307 | Desch | Aug. 12, 1947 |

FOREIGN PATENTS

| Number | Country | Date |
|---|---|---|
| 687,419 | Germany | Jan. 29, 1940 |